Figure 3:
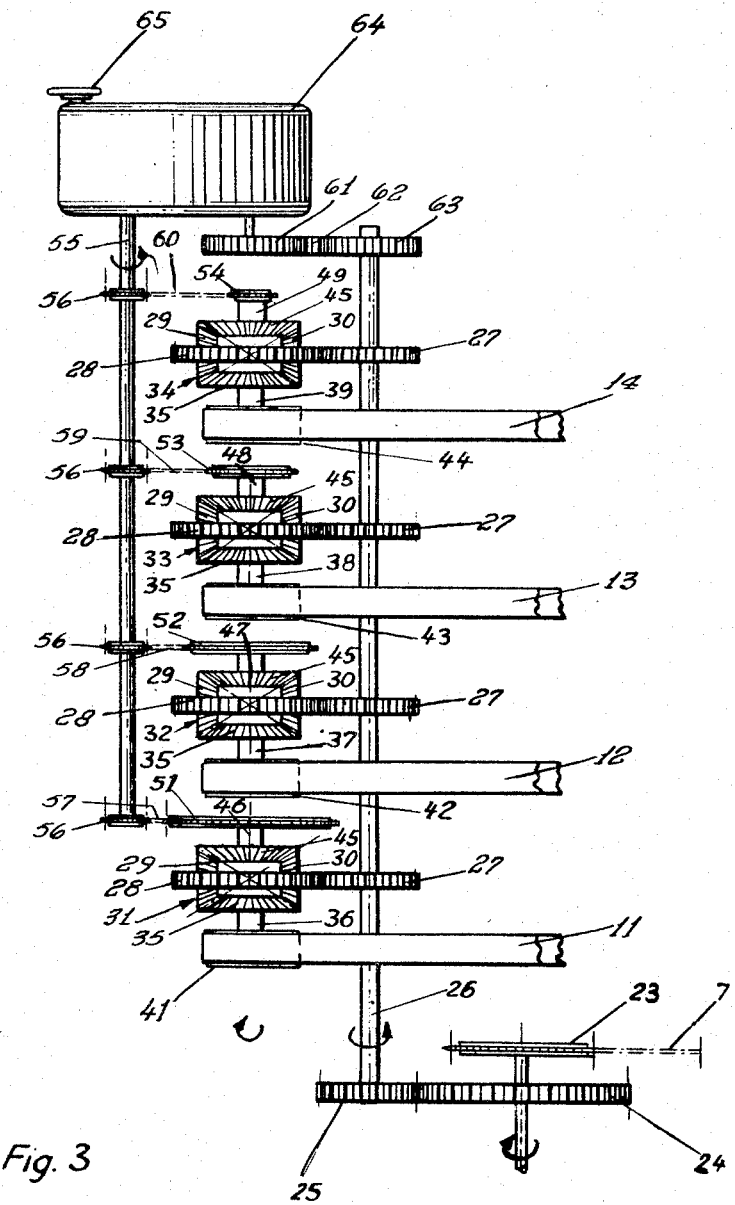

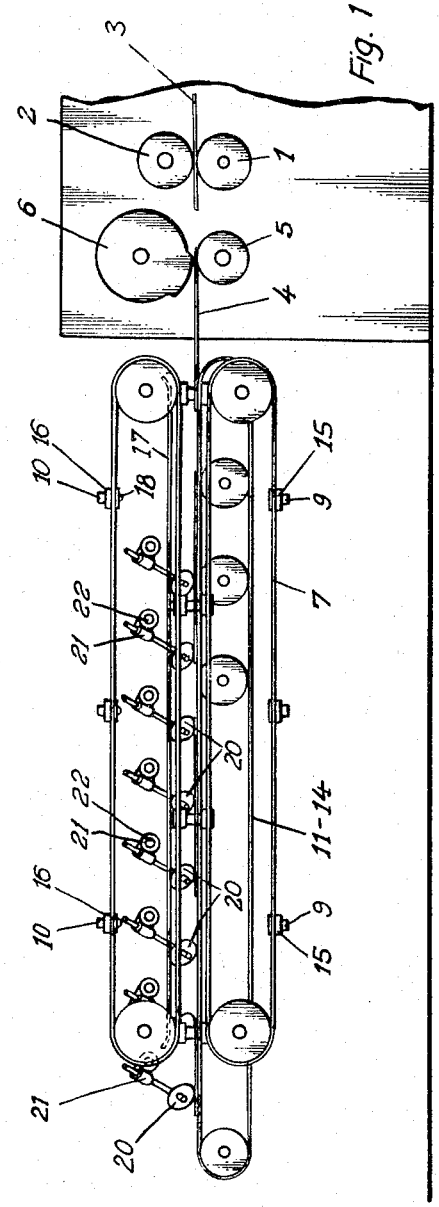
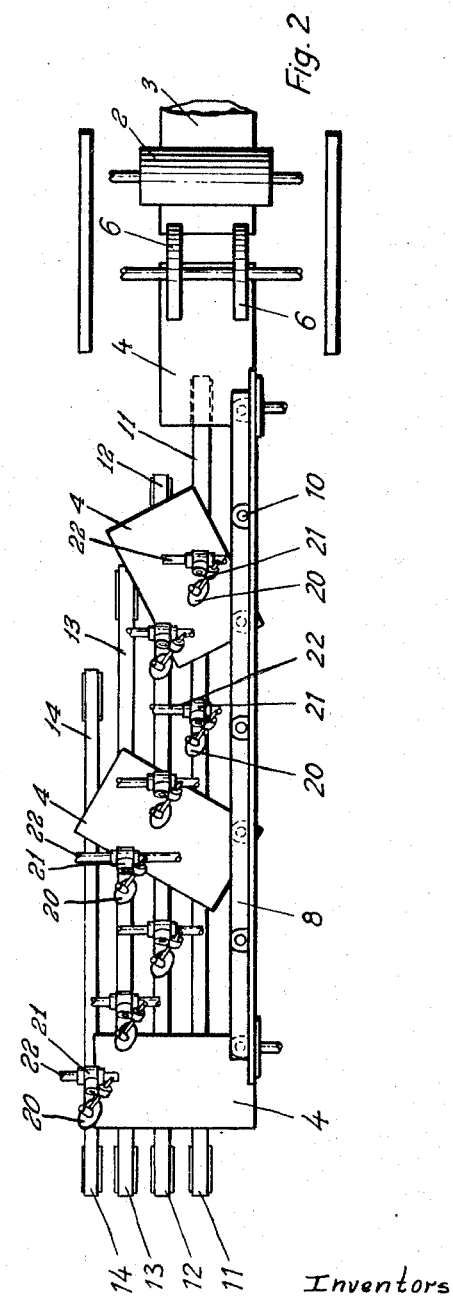

United States Patent Office 3,321,062
Patented May 23, 1967

3,321,062
APPARATUS FOR SHIFTING BAG OR SACK WORK-PIECES DURING HORIZONTAL CONVEYANCE FROM LONGITUDINAL TO TRANSVERSE
Friedrich Franz Brockmüller and Winfried Hedrich, Lengerich, Germany, assignors to Windmoller & Holscher
Filed Sept. 21, 1965, Ser. No. 488,950
Claims priority, application Germany, Oct. 1, 1964, W 37,652
7 Claims. (Cl. 198—33)

The present invention relates to an apparatus for shifting horizontally conveyed bag or sack workpieces during a horizontal conveyance from longitudinal to transverse conveyance or vice versa. The invention provides an apparatus which is of the kind described and in which the conveyance of the workpieces during the pivotal movement is continued substantially at the same speed and there is no need for a change in the direction of conveyance.

The invention proposes an apparatus for shifting horizontally conveyed bag or sack workpieces during a horizontal conveyance from longitudinal to transverse conveyance or vice versa, which apparatus comprises a pair of conveyor chains, which are arranged one over the other and have gripping members that cooperate in pairs and are freely rotatable on vertical axes and serve for gripping and holding each workpiece at one point, and at least one conveyor belt, which is parallel to the conveyor chains and supports the workpieces at other points and is driven at a differential velocity relative to the pair of conveyor chains, the direction of the relative velocity corresponding to the direction of the desired deflection of the workpieces, and pressure rollers being provided over the conveyor belt or belts and serving for pressing the workpieces against the conveyor belts. At those points where they are gripped by the gripping members, the workpieces are moved at the original speed of conveyance whereas the parallel conveyor belts revolving at a different speed effect a pivotal movement of the workpieces during the conveyance. A change in the direction of conveyance is not required during this operation. The pressure rollers ensure a sufficiently large driving friction between the conveyor belts and the workpieces independently of the material and weight of the workpieces and of the nature of the surface of the conveyor belts. The pressure rollers are freely rotatably moved and are directly or, during the passage of a workpiece, indirectly driven by the conveyor belts. It is particularly desirable to provide a plurality of conveyor belts which are parallel to the conveyor chains, and to arrange said conveyor belts so that their differential velocity relative to the conveyor chains increases with the distance of the belts from the chain, in accordance with the fact that the velocity of the pivotal movement of the workpieces increases with the distance from the gripping members. According to a preferred embodiment of the invention, the axes of the pressure rollers may be at an oblique angle to the axes of the reversing pulleys of the conveyor belts in the sense of the desired pivotal movement and may be inclined so that the pressure rollers promote the pivotal movement of the workpieces and hold the same taut at the same time.

A further proposal according to the invention relates to the drive for the conveyor belts which are parallel to the conveyor chains.

Various factors determine the path length required for a shifting of the workpieces from longitudinal to transverse conveyance during the continuous advance of the work pieces at the original speed of conveyance and in the original direction of conveyance. These factors vary from time to time and include the friction which exists between the conveyor belts and the workpieces and causes the workpieces to be carried along by the conveyor belts, and the length of the workpieces, which determines the time when the pivotal movement begins. If the workpieces are short, the pivotal movement may begin sooner than with longer workpieces because the distance of the pivot point where the workpieces are gripped from, e.g., a guillotine of a preceding machine corresponds, at the time when the gripping beings, to the length of the workpieces and in the case of longer workpieces this point has further advanced with the pair of conveyor chains before the workpiece has been released by the preceding apparatus and before the gripping has begun. The friction between the conveyor belts and the workpieces depends on the weight and on the material of the workpieces.

To ensure in each case a pivotal movement of the workpieces through 90°, it would seem obvious to use a large path length and select the same for the least favorable case. This may lead to difficulties, however, in the processing of shorter workpieces because their pivotal movement begins sooner so that their pivotal movement through 90° is completed sooner and the pivotal movement is then continued on the rest of the path. Such a continued pivotal movement may be avoided by the provision of at least one endless chain, which extends parallel to the conveyor chains at the same speed as the latter and is provided with stop members for limiting the pivotal movement of the workpiece. Such an or damage to the workpieces will be avoided. Such buckling or damage may result in the formation of rejects during the further processing. The design of the apparatus for the least favorable conditions that are encountered in practice results also in a larger space requirement and higher cost.

In a further development of the invention, the difficulties which have been set forth hereinbefore are avoided in that in the apparatus described initially hereinbefore each conveyor belt driven to perform a movement relative to the pair of conveyor chains is driven by a transmission which is variable, preferably infinitely variable. In such apparatus the conveyor belt or belts which are driven at a differential velocity relative to the pair of conveyor chains can always be driven at the velocity which is proper in each case so that the pivotal movement can be completed on the path which is available and will not be completed too soon.

In an additional development of the invention, an apparatus which comprises a plurality of conveyor belts moved at differential velocities which have a constant ratio to the velocity of the conveyor chains may further comprise a common variable transmission included in the drive means for the conveyor belts before the distribution of the drive to the various driving pulleys for the conveyor belts.

In a preferred embodiment of the drive arrangement according to the invention, each conveyor belt is driven by the output member of a differential associated with the belt, an input member of this differential is driven at a non-variable basic speed, the third member of the differential is driven by the variable transmission, and different transmission ratios are provided between the output shaft of the variable transmission and the various differential members driven by it. These different transmission ratios determine the constant ratio of the differential velocities of the conveyor belts to the velocity of the conveyor chains. The differential velocities which are required can be adjusted by the infinitely variable transmission. As the infinitely variable transmission supplies only the additional speed to the differentials, the power to be transmitted through the infinitely variable transmission is relatively small so that the infinitely variable transmission may be small in size.

An illustrative embodiment of the apparatus according to the invention for shifting bag or sack workpieces during a horizontal conveyance from a longitudinal conveyance to a transverse one will be described more fully hereinafter with reference to the accompanying drawing, in which:

FIG. 1 is a diagrammatic side elevation showing a first embodiment of the apparatus according to the invention, FIG. 2 is a top plan view showing the apparatus of FIG. 1, and FIG. 3 shows the means for driving the conveyor chain and belts in the apparatus according to FIGS. 1 and 2.

In the selected embodiment, the apparatus for shifting sack workpieces during a horizontal conveyance from longitudinal to transverse conveyance succeeds a tube drawing machine, the rear end of which is diagrammatically indicated. At a point which is predetermined by perforations, a tube section 4 is torn from a single- or multi-ply tubing 3 of paper or plastics material, which is advanced by a pair of feed rolls 1, 2. Tearing is effected by a roll 5 and two segment bodies 6, which rotate at a higher peripheral velocity than the pair of rollers 1, 2. The periphery of the segment members exceeds the largest length of a sack workpiece which can be made on the machine.

The sack workpieces 4 which are torn off the tube 3 are fed to a pair of conveyor chains 7, 8. The conveyor chains which revolve one over the other in a vertical plane carry gripping members 9, 10, which cooperate in pairs and grip a tube section close to a leading edge at an exactly predetermined time and continue the advance of the workpiece. The velocity of the chains corresponds to the peripheral velocity of the segment members 6 and of the roll 5. Four conveyor belts 11, 12, 13, 14 are disposed beside the lower conveyor chain 7. The upper course of each of these conveyor belts lies in the plane of conveyance. These conveyor belts move at a higher velocity than the conveyor chains 7, 8. Besides, the velocity of conveyor belt 14 exceeds that of conveyor belt 13, the velocity of the latter exceeds that of conveyor belt 12 and the velocity of belt 12 exceeds that of conveyor belt 11.

When released by the roll 5 and the segment members 6, the tube sections 4 are held between the gripping members 9, 10, which are rotatably mounted on the conveyor chains 7, 8. The conveyor belts move faster than the conveyor chains and cause the tube sections to be pivotally moved through 90° during their conveyance. Each gripping member 9 is rotatably mounted on a bracket 15 for a limited axial displacement. A compression spring tends to move the gripping member to its outer limiting position. Each gripping member 10 is also rotatably mounted in a bracket 16 for a limited axial displacement. A compression spring tends to urge the gripping member 10 to its inner limiting position. By a guide rail 17, the gripping member 10 is moved to and held in its gripping position by a guide bar 17. When the pins 18 of the gripping member 10 move under the curved receiving end of the guide rail, the gripping members 9, 10, which cooperate in pairs, are urged against each other. As the gripping members must not grip a tube section until it has been gripped by the segment members 6, and the gripping members must grip each workpiece at the same distance from its leading edge, the point where the tube sections are gripped is adjustable in accordance with the length of the tube sections. Besides, the conveyor chains 7, 8 and the segment members 6 are adjustable relative to each other in the peripheral direction.

The conveyor chains 7, 8 are suitably driven by the main drive of the tube drawing machine. This drive drives also the segment members 6 and the roll 5. This arrangement is desirable because, as has been stated hereinbefore, the velocity of the conveyor chains must correspond to the peripheral velocity of the segment members and of the roll. The conveyor belts 11, 12, 13, 14 may be driven, e.g., by the drive shaft of the conveyor chain 7.

Pressure rollers 20 are disposed above the plane of conveyance of the workpiece. Each of these rollers lies opposite to a conveyor belt 11, 12, 13 or 14 and urges each tube section 4 against the respective conveyor belt. This arrangement ensures a sufficiently high driving friction between the conveyor belts and the tube sections so that a pivotal movement of the tube sections through 90° will be reliably achieved. The pressure rollers 20 are freely rotatably mounted and are rotated directly by the conveyor belts or by the passing tube sections. The axes of the pressure rollers are at an oblique angle to the axes of the rollers of the conveyor belts and are inclined to act on the tube sections in the sense of the desired pivotal movement and to pull the tube sections flat at the same time. Each pressure roller is secured by an adjustable holder 21 to a bar 22, which is held by frame members, not shown, of the apparatus.

In FIG. 3, a driving sprocket 23 for the conveyor chain 7 is shown. A gear 24 is non-rotatably secured to the drive shaft of this driving sprocket 23 and is in mesh with a gear 25 on a shaft 26, which serves for driving the conveyor belts 11 to 14. The shaft carries a gear 27 for driving each conveyor belt. Each gear 27 is in mesh with a gear 28, which carries two differential wheels 29, 30 of each of the bevel-gear differentials 31, 32, 33, 34. Each differential comprises a bevel wheel 35, which is in mesh with the two differential wheels and is non-rotatably secured to a shaft 36, 37, 38 or 39 which has further rotatably secured to it a driving pulley 41, 42, 43 or 44. The shaft of the driving sprocket 23 and shafts 26 and 36 to 39 rotate in the directions of the arrows shown in FIG. 3.

The gears 27 impart to the driving pulleys 41 to 44 of the conveyor belts 11, e.g., the same basic velocity, which may correspond, e.g., to the velocity of the conveyor chains 7 and 8. In this case the differential velocity of the driving pulleys 41 to 44 relative to the pair of conveyor chains 7, 8 is obtained by the drive imparted to the bevel wheel 45 of each differential 31 to 34. Each bevel wheel 45 is non-rotatably mounted on a shaft 46, 47, 48 or 49. This shaft has also non-rotatably secured to it a sprocket 51, 52, 53 or 54. Sprockets 51 to 54 are driven by a shaft 55 through a sprocket 56 associated with each of sprockets 51, 52, 53 and 54, and a chain 57, 58, 59 or 60. The direction of rotation of shaft 55 is also indicated by the arrow shown in the drawing. Shaft 55 is driven by shaft 26 through gears 61, 62, 63 and an infinitely variable transmission 64 of any known type.

The diameter of sprockets 51 to 54 decreases from one sprocket to the next so that the differential velocity of the conveyor belts relative to the pair of conveyor chains 7, 8 increases from one belt to the next in the order from 11 to 14. The differential velocities of conveyor belts 11 to 14 relative to the pair of conveyor chains 7, 8 may be changed by a change of the transmission ratio of transmission 64, e.g., by an operation of the handwheel 65. This may even be effected during the operation of the apparatus. The optimum velocity of the conveyor or belts for the shifting of the horizontally conveyed tube sections 4 from longitudinal to transverse conveyance can thus be adjusted.

As has been stated hereinbefore, the differential velocity of the driving pulleys 41 to 44 relative to the pair of conveyor chains 7, 8 is obtained by imparting a drive to the bevel wheel 45 whereas the basic velocity, which is the same for all driving pulleys, is imparted to the driving pulleys by the gears 27. The ratio of the basic velocity to the differential velocity may readily be changed by the selection of a suitable transmission ratio in the drive. For instance, the constant basic velocities of the belt drives may decrease from belt to belt. This would have to be effected by the use of gears 27 and 28 forming gear trains of different transmission ratios. In this case, the infinitely variable transmission may also be adjusted so that the belts move at the speed of the conveyor chains so that the sack workpieces are not turned at all. The transmission ratio between sprockets 56 and 51 to 54 may have a non-linear relation. Such a non-linear relation may also be combined with means for driving the belts at basic speeds that decrease from belt to belt.

What is claimed is:

1. Apparatus for moving a workpiece along a fixed plane while shifting the position of said workpiece in said plane, said apparatus comprising a first conveying means for conveying said workpiece along said plane, at least one additional workpiece conveying means moving parallel to said first conveying means, means for driving said first conveying means and said additional conveying means at different velocities corresponding to the degrees of said shifting, and pressure rollers adjustably mounted above said additional conveying means and adapted to engage said workpiece to increase the frictional engagement between said additional conveying means and said workpiece.

2. Apparatus for moving an elongated workpiece along a fixed plane while shifting the position of said workpiece in said plane, said apparatus comprising first conveying means disposed adjacent said workpiece, gripping means carried by said conveying means and cooperating to grip a portion of said workpiece and move it along said plane, at least one additional workpiece conveying means moving parallel to said first conveying means and defining a surface on which said workpiece rides, and means for driving said first conveying means and said additional conveying means at differential velocities corresponding to the degree of said shifting.

3. The apparatus of claim 2 further comprising pressure rollers adjustably mounted above said additional conveying means and adapted to engage said workpiece to increase the frictional engagement between said additional conveying means and said workpiece.

4. The apparatus of claim 3 wherein the axes of said pressure rollers are inclined with respect to said plane.

5. The apparatus of claim 2 wherein said additional conveying means comprises a plurality of belts over each of which a portion of said workpiece passes, and wherein said drive means drives said belts at differential velocities which have a constant ratio to the velocity of said first conveying means.

6. The apparatus of claim 5 wherein said drive means includes a common variable transmission so that said differential velocities may be adjusted.

7. The apparatus of claim 6 further comprising a differential operatively connected to said variable transmission and to each of said belts, the output members of said differentials driving its respective belt, said drive means including means driving the input members of said differentials at a non-variable basic speed, the third members of said differentials being driven by said variable transmission, wherein different transmission ratios are provided between the output shaft of said variable transmission and said third members.

References Cited by the Examiner

UNITED STATES PATENTS

| | | | |
|---|---|---|---|
| 1,069,362 | 8/1913 | Wegner | 198—33 |
| 1,192,832 | 7/1916 | Sherman | 198—33 |
| 1,616,101 | 2/1927 | Ackley | 198—33 |

EVON C. BLUNK, *Primary Examiner.*

EDWARD A. SROKA, *Examiner.*